(12) United States Patent
Sugimoto et al.

(10) Patent No.: US 7,696,855 B2
(45) Date of Patent: Apr. 13, 2010

(54) STRAIN GAUGE FOR MEASURING LARGE STRAINS

(75) Inventors: Takeshi Sugimoto, Mitaka (JP); Hiroaki Furukawa, Fuchu (JP); Yasuhiro Uchino, Mitaka (JP)

(73) Assignee: Kyowa Electronic Instruments Co., Ltd., Tokyo (JP)

( * ) Notice: Subject to any disclaimer, the term of this patent is extended or adjusted under 35 U.S.C. 154(b) by 548 days.

(21) Appl. No.: 11/787,840

(22) Filed: Apr. 17, 2007

(65) Prior Publication Data

US 2007/0279180 A1   Dec. 6, 2007

(30) Foreign Application Priority Data

Apr. 18, 2006   (JP) .............................. 2006-115065

(51) Int. Cl.
*G01L 1/22* (2006.01)
(52) U.S. Cl. .................... 338/2; 338/5; 73/862.625; 73/862.627
(58) Field of Classification Search ................. 338/2–5; 73/862.621, 862.625, 862.627, 718
See application file for complete search history.

(56) References Cited

U.S. PATENT DOCUMENTS

| | | | |
|---|---|---|---|
| 2,885,524 A | 5/1959 | Eisler | |
| 4,050,976 A | 9/1977 | Reiters | |
| 4,104,605 A * | 8/1978 | Boudreaux et al. | 338/2 |
| 5,192,938 A | 3/1993 | Ort | |
| 5,631,622 A * | 5/1997 | Hauber et al. | 338/2 |
| 6,275,137 B1 * | 8/2001 | Doppalapudi et al. | 338/2 |
| 6,614,342 B1 * | 9/2003 | Kanamori | 338/2 |
| 6,736,014 B2 * | 5/2004 | Shinbo | 73/777 |
| 6,823,739 B2 * | 11/2004 | Ueno et al. | 73/717 |

FOREIGN PATENT DOCUMENTS

| | | |
|---|---|---|
| CN | 101059331 | 10/2007 |
| EP | 1 847 799 | 4/2007 |
| JP | 3040684 | 6/1997 |

* cited by examiner

*Primary Examiner*—Kyung Lee
(74) *Attorney, Agent, or Firm*—Jordan and Hamburg LLP

(57) ABSTRACT

The strain gauge for measuring large strains has metallic foil pattern sections including a gauge element pattern section, gauge tab pattern sections and connecting pattern sections attached to a gauge base. The gauge base having the metallic foil pattern sections attached and connected with the bases of gauge leads is almost entirely covered on the surface with a laminating film, and the tip of the laminating film is extended by a predetermined length from the tip end of the gauge base, to form a protruding portion. The protruding portion functions to prevent the separation of the gauge base from an object to be measured.

8 Claims, 3 Drawing Sheets

STRAIN GAUGE FOR MEASURING LARGE STRAINS

BACKGROUND OF THE INVENTION

1. Field of the Invention

This invention relates to a strain gauge. In more detail, it relates to a strain gauge in which metallic foil pattern sections including a narrow gauge element pattern section formed of a resistance material and capable of changing its resistance in response to a detected strain, at least a pair of wide gauge tab pattern sections connected with gauge leads, and at least a pair of connecting pattern sections capable of electrically connecting the respective ends of said gauge tab pattern sections and said gauge element pattern section, are attached onto a gauge base formed of a flexible insulation material; and said gauge base having said metallic foil pattern sections attached is covered on the surface side with a laminating film. It is a strain gauge for measuring large stains, which can be used also to measure large strains.

2. Description of the Related Art

A strain gauge is used to convert the mechanical strain on the surface of a machine or structure (hereinafter called "an object to be measured") into a resistance value or electric quantity such as voltage, for accurately measuring the deformation (strain) of each portion of an object to be measured, for quantitatively obtaining the strain distribution of the object to be measured, without breaking it in a state where it is actually used.

A conventional strain gauge used for such an application has a constitution as shown in FIGS. 4 and 5.

FIG. 4 is a plan view typically showing the constitution of a conventional foil gauge type uniaxial strain gauge.

FIG. 5 is a sectional view showing a state where the strain gauge of FIG. 4 is bonded to an object to be measured.

In FIGS. 4 and 5, symbol 1 denotes a gauge base formed of a flexible insulation material. Symbol 2 denotes a narrow gauge element pattern section formed by patterning a conductive foil (metallic foil) by a photo etching technique into a continuously folded-back zigzag pattern with a predetermined length (gauge length) as shown in FIG. 4. The resistance value of the gauge element pattern section changes in response to the strain of the object to be measured 9 transmitted through said gauge base 1.

Symbols 3a and 3b denote a pair of gauge tab pattern sections formed of the same material as that of said gauge element pattern section 2 simultaneously with it and are formed to be wider compared with the width of the strand of the gauge element pattern section 2, to facilitate the connection with gauge leads (lead wires) 4a and 4b. Symbols 5a and 5b denote connecting pattern sections connected at their ends on one side with said pair of gauge tab pattern sections 3a and 3b and connected at their ends on the other side with the respective ends of the gauge element pattern section 2. Symbols 6a and 6b denote soldering portions for electrically connecting the gauge leads 4a and 4b with the gauge tab pattern sections 3a and 3b. Symbol 7 denotes a laminating film covering the surfaces of the gauge element pattern section 2, the gauge tab pattern sections 3a and 3b and the connecting pattern sections 5a and 5b for preventing the deterioration caused by moisture absorption and the damage incurred from outside.

In the case where a strain gauge constituted as above is used for measuring large strains, various problems arise.

First, a general foil type strain gauge has a difficulty that, for example, in the case where it is bonded to an object to be measured and elongated by pulling, the disconnection due to breakage occurs in the region A of FIG. 4 (the gauge tab pattern sections 3a and 3b) at a strain of about 8%, since stress concentration occurs at the boundary portion between the region A (the gauge tab pattern sections 3a and 3b) and the region B (the connecting pattern sections 5a and 5b), namely near the junction between the region A and the region B.

The reasons are considered to be that the region A (the gauge tab pattern sections 3a and 3b) is larger in foil area than the region B (the connecting pattern sections 5a and 5b) and that the region A is in a state of being more unlikely to be elongated than the region B, since the region A is soldered to the gauge leads 4a and 4b.

So, the applicant proposed a strain gauge as shown in FIG. 4 in the past (Patent Document 1: JP3040684U).

A feature of the strain gauge shown in FIG. 4 and described in Patent Document 1 is that slits are formed for deconcentrating the stress at the portions where the gauge tab pattern sections 3a and 3b are connected with the connecting pattern sections 5a and 5b, to thereby prevent the disconnection due to breakage. This is described below more particularly. The gauge tab pattern sections 3a and 3b are formed to have a circular arc at their ends on the side facing the gauge element pattern section 2, with the hollow face of the circular arc turned toward the gauge element pattern section 2 (leftward in FIG. 4). Further, at the junctions of the gauge tab pattern sections 3a and 3b with the connecting pattern section 5a and 5b, slits 8a and 8b with a depth starting from the ends of the gauge tab pattern sections 3a and 3b on the gauge element pattern section 2 side to reach near the central portions of the gauge tab pattern sections 3a and 3b are formed in the sensitive axis direction.

In the strain gauge constituted as described above and described in Patent Document 1, the regions near the deepest portions 8c and 8d of the slits 8a and 8b where the stress is concentrated are near the central portions of the wide and long gauge tab pattern sections 3a and 3b, hence respectively having a wide area. So, the stress is deconcentrated to eliminate the possibility of the disconnection due to breakage otherwise caused by stress concentration.

Therefore, the gauge element pattern section 2 receiving the strain of an object to be measured, through the gauge base 1 receives the strain and changes its resistance in response to the strain. Though the strain limit value of a conventional strain gauge used for measuring large strains was less than 10%, the strain gauge shown in FIG. 4 can measure strains of more than about 15% without causing the disconnection due to breakage.

[Patent Document 1] JP3040684U

However, in recent years, it is demanded to develop a strain gauge capable of measuring large strains of more than said strain limit of 15%.

So, the present inventors grappled with various problems, for meeting the demand.

At first, the adhesive strengths of presently commercially available adhesives were tested, and for example, "CC-36," a commodity sold by the present applicant did not have any problem for strains of 20% or more, and was effective also for large strains of 30% or more. However, the strain limit of bonded strain gauges per se could not exceed 15%.

Further, the pattern of the metallic foil used to form the gauge element pattern, etc. and the foil material were experimentally changed, but no significant improvement could be seen.

Furthermore, for enhancing the adhesive strength of the gauge base to an object to be measured, various treatments of grinding the bonded surfaces were tried, but though some effects of improvement could be seen, the trials could not find a fundamental solution.

Moreover, to enhance the adhesiveness, it was also considered to enlarge the adhesive area of the gauge base, but the strain gauge as a whole became so large as to limit the applicable objects to be measured as another problem.

This invention has been completed in view of the situation as described above. A first object of this invention is to provide a strain gauge for measuring large strains, which can be used to measure large strains of more than 20%. A second object is to provide a strain gauge for measuring large strains, which is unlikely to be separated from the object to be measured even if a large strain acts. A third object is to provide a strain gauge for measuring large strains, which can be kept very small in size. A fourth object is to provide a strain gauge for measuring large strains, which is easy to produce, easy to bond and inexpensive.

SUMMARY OF THE INVENTION

The strain gauge for measuring large strains according to a first aspect of the invention, for achieving said first to fourth objects, is a strain gauge, in which metallic foil pattern sections including a narrow gauge element pattern section formed of a resistance material and capable of changing its resistance in response to a detected strain, at least a pair of wide gauge tab pattern sections connected with gauge leads, and at least a pair of connecting pattern sections capable of electrically connecting the respective ends of said gauge tab pattern sections and said gauge element pattern section, are attached onto a gauge base formed of a flexible insulation material; and said gauge base having said metallic foil pattern sections attached is covered on the surface side with a laminating film; wherein said laminating film is extended by a predetermined length from the end of the gauge base on said gauge element pattern section side, to form a protruding portion, and when the strain gauge is attached to an object to be measured, the back side of said gauge base and the back side of said protruding portion can be attached to said object to be measured.

In the strain gauge for measuring large strains according to a second aspect of the invention, the laminating film is formed of at least one resin selected from polyesters, polyamideimides and polyimides.

In the strain gauge for measuring large strains according to a third aspect of the invention, the length of said protruding portion is set at 0.3 mm to 1.5 mm from said end of the gauge base.

In the strain gauge for measuring large strains according to a fourth aspect of the invention, the length of said connecting pattern sections is longer than that of the general strain gauge, and said gauge tab pattern sections are kept far away from said gauge element pattern section.

In the strain gauge for measuring large strains according to a fifth aspect of the invention, the dimension in the width direction of said gauge base is set at a smaller value compared with that of the general strain gauge.

In the strain gauge for measuring large strains according to a sixth aspect of the invention, an alignment mark as a reference mark for attaching the strain gauge to an object to be measured is formed at a position apart from said end portion of said gauge base.

In the strain gauge for measuring large strains according to a seventh aspect of the invention, slits for deconcentrating the stress to thereby prevent the disconnection due to breakage are formed in the portions connected with said connecting pattern sections, of said gauge tab pattern sections.

In the strain gauge for measuring large strains according to an eighth aspect of the invention, said slits are formed along the sensitive axis of the gauge element pattern section, with a depth starting from the ends of the gauge tab pattern sections on said gauge element pattern section side to reach near the central portions of the gauge tab pattern sections.

In the first aspect of the invention, the strain gauge for measuring large strains, in which metallic foil pattern sections including a narrow gauge element pattern section formed of a resistance material and capable of changing its resistance in response to a detected strain, at least a pair of wide gauge tab pattern sections connected with gauge leads, and at least a pair of connecting pattern sections capable of electrically connecting the respective ends of said gauge tab pattern sections and said gauge element pattern section, are attached onto a gauge base formed of a flexible insulation material; and said gauge base having said metallic foil pattern sections attached is covered on the surface side with a laminating film; has the following constitution:

said laminating film is extended by a predetermined length from the end of the gauge base on said gauge element pattern section side, to form a protruding portion, and when the strain gauge is attached to an object to be measured, the back side of said gauge base and the back side of said protruding portion can be attached to said object to be measured. So, the protruding portion of the laminating film, attached to the object to be measured, effectively inhibits the separation of the gauge base on the tip side corresponding to the gauge element pattern section side, allowing a large strain of significantly more than 20% to be highly accurately measured, though such a large strain could not be measured by the conventional strain gauge. Further, the increase of size due to the protruding portion is slight and neither poses any problem nor increases the production cost. Thus, a strain gauge for measuring large strains, which can be easily attached to the object to be measured, can be provided.

In the second aspect of the invention, said laminating film is formed of anyone resin selected from polyesters, polyamideimides and polyimides. So, since materials used as ordinary laminating films and gauge bases can be used, a strain gauge for measuring large strains, which can exhibit the effect peculiar to claim 1, can be provided without increasing the production cost.

In the third aspect of the invention, the length of said protruding portion is set at 0.3 mm to 1.5 mm from said end of the gauge base. So, the increase of dimension in reference to the length of the gauge base is not so large. If the length of the protruding portion is smaller than said range, the separation preventive effect is insufficient, and if it is larger than said range, the increase of size is disadvantageous while the separation preventive effect cannot be enhanced further.

In the fourth aspect of the invention, the length of said connecting pattern sections is longer than that of the general strain gauge, and said gauge tab pattern sections are kept far away from said gauge element pattern section. Since the boundary portions between the gauge tab pattern sections and the connecting pattern sections where the stress is likely to be concentrated are kept very far away from the gauge element pattern section, the gauge element pattern section is unlikely to be affected by stress concentration. Thus, a gauge strain for measuring large strains, which can highly accurately measure large strains, can be provided.

In the fifth aspect of the invention, the dimension of said gauge base in the width direction is set at a smaller value compared with that of the general strain gauge. So, the deformation in the width direction by the Poisson ratio is small, and a strain gauge for measuring large strains, which can advantageously highly inhibit the separation of the gauge base, can be provided.

In the sixth aspect of the invention, an alignment mark as a reference mark for attaching the strain gauge to an object to be measured is formed at a position apart from said end of said gauge base, so that the highly stiff alignment mark can be kept away from the gauge base end where separation is likely to occur. Thus, there can be provided a strain gauge for measuring large strains, which can keep the elongation property at the gauge base end uniform, hence can inhibit the separation at the end of the gauge base on the gauge element pattern section side and can further expand the large strain measuring range.

In the seventh aspect of the invention, slits for deconcentrating the stress to thereby prevent the disconnection due to breakage are formed in the portions connected with said connecting pattern sections, of said gauge tab pattern sections. So, the stress concentration is caused in the central portions of the wide gauge tab pattern sections, for allowing stress deconcentration, and even if an elongation greatly larger than the conventional strain limit value is applied, the disconnection due to breakage does not occur. Thus, also in relation with the separation preventive effect of said protruding portion, there can be provided a strain gauge for measuring large strains, which allows the measurable strain range to be greatly expanded.

In the eighth aspect of the invention, said slits are formed along the sensitive axis of the gauge element pattern section, with a depth starting from the ends of the gauge tab pattern sections on said gauge element pattern section side to reach near the central portions of the gauge tab pattern sections. So, a strain gauge for measuring large strains, capable of exhibiting the same effect as that of the seventh aspect of the invention, can be provided.

DETAILED DESCRIPTION OF THE PREFERRED EMBODIMENTS

The strain gauge for measuring large strains of this invention is described below in detail based on the embodiments of this invention in reference to the drawings.

Figure 1:
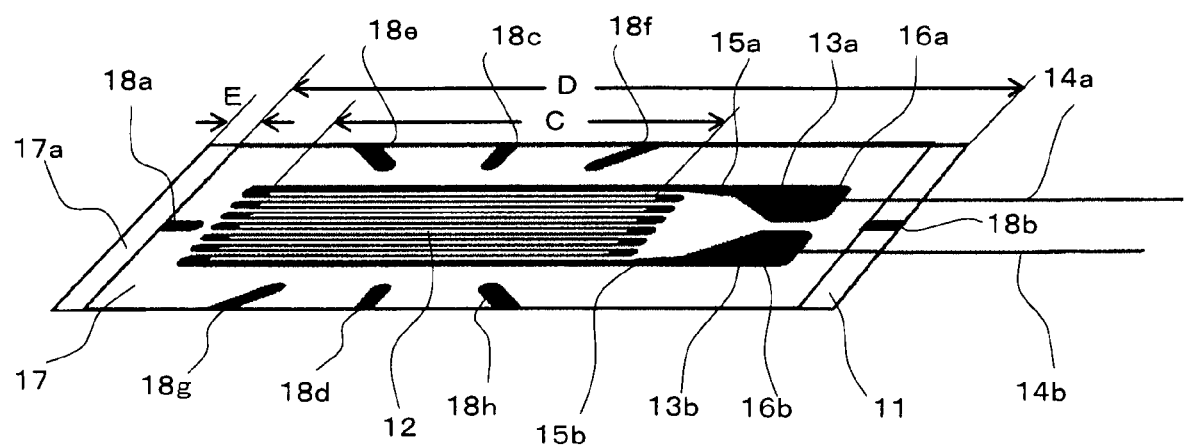
FIG. 1 is a perspective view showing the entire constitution of a strain gauge for measuring large strains as a first embodiment of this invention.
Figure 2:
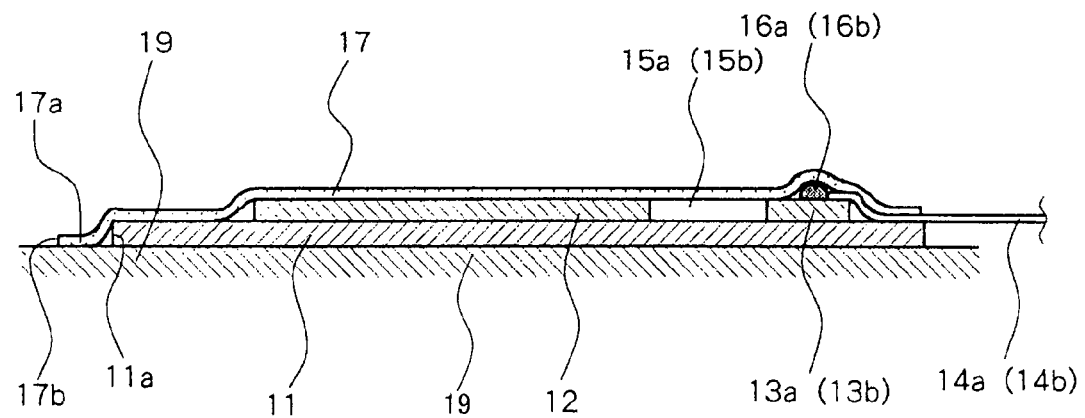
FIG. 2 is a sectional view typically showing a state where the strain gauge for measuring large strains shown in FIG. 1 is attached to an object to be measured.

FIG. 1 is a perspective view typically showing the constitution of a strain gauge for measuring large strains as a first embodiment of this invention. FIG. 2 is a sectional view showing a state where the strain gauge of FIG. 1 is attached to an object to be measured.

The strain gauge shown in FIGS. 1 and 2 is an example of a foil gauge type uniaxial strain gauge. In FIGS. 1 and 2, symbol 11 denotes a gauge base formed of a flexible insulation material such as a polyimide resin as a rectangular sheet.

Symbol 12 denotes a narrow gauge element pattern section formed by patterning a resistance material such as a foil made of Cu—Ni alloy by a photo etching technique into a continuously folded-back zigzag pattern with a predetermined gauge length C as shown in FIG. 1. Its resistance value can be changed in response to the strain caused in the object to be measured and transmitted through said gauge base 11.

Symbols 13a and 13b denote a pair of gauge tab pattern sections formed of the same material as that of said gauge element pattern section 12 simultaneously with it and are formed to be very wider compared with the width of the gauge element pattern section 12, to facilitate the connection with gauge leads (lead wires) 14a and 14b.

Symbols 15a and 15b denote connecting pattern sections connected at the ends on one side with said pair of gauge tab pattern sections 13a and 13b and connected at the ends on the other side with the respective ends of the gauge element pattern section 12.

Symbols 16a and 16b denote soldering portions for electrically connecting the gauge leads 14a and 14b with the gauge tab pattern sections 13a and 13b. Symbol 17 denotes a laminating film covering the surfaces of metallic foil pattern sections including the gauge element pattern section 12, the gauge tab pattern sections 13a and 13b and the connecting pattern sections 15a and 15b, and the laminating film has a protruding portion 17a extended by a predetermined length from the end of the gauge base 11 on the gauge element pattern section 12 side (the left end in FIGS. 1 and 2). The material of the laminating film 17 can be a resin such as a polyester, polyamideimide or polyimide, and such a resin is processed into a film. The resin is not necessarily required to be processed into a film beforehand. It can also be applied by brushing or spraying using a spray gun, etc., to form a coating film.

However, the easiest production method is to use a resin film formed beforehand, for covering the gauge base 11 having the gauge element pattern section 12, etc. attached, and to extend it from the tip end 11a of the gauge base 11 by a predetermined length (E).

The length of the protruding portion 17a, namely, the length E of the protruding portion 17a from the tip end 11a of the gauge base 11 to the tip end 17b of the protruding portion 17a of the laminating film 17 in FIG. 2 is required to be kept, for example, in a range from 0.3 mm to 1.5 mm, though it depends on the base length D of the strain gauge.

Figure 6:
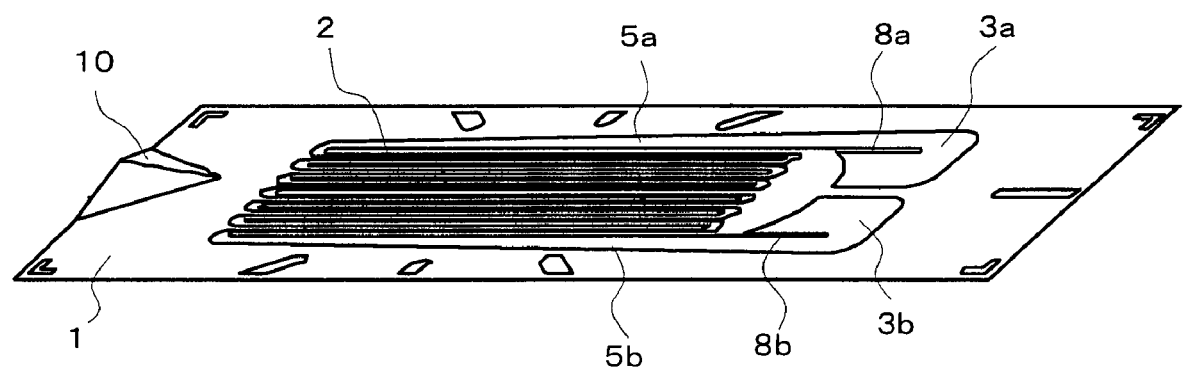
FIG. 6 is a perspective view showing a state of separation caused when a large strain is made to act on a conventional strain gauge.

Meanwhile, the present inventors grappled with various problems for enlarging the strain limit of the conventional large strain gauge, and made an intensive study to explore the cause. As a result, they found a phenomenon that if the strain gauge is greatly displaced, the gauge base is separated from the object to be measured. They could elucidate that in the conventional strain gauge, as shown in FIG. 6, the separation 10 at the tip end of the gauge base 1 on the gauge element pattern section 2 side is remarkable.

Based on this finding, the inventors found that if the laminating film 17 used to cover the gauge element pattern section 12 and the gauge tab pattern sections 13a and 13b on the tip side of the gauge base 11 for preventing the deterioration caused by moisture absorption and the damage incurred from outside is further extended to form the protruding portion 17a with a length of 0.3 mm to 1.5 mm from the tip end 11a of the gauge base 11 on the tip side, and the protruding portion 17a is attached to the object to be measured, then the separation at the tip portion of the gauge base 11 can be prevented.

The action of the strain gauge for measuring large strains as the first embodiment constituted as described above is explained below.

At first, in the strain gauge as the first embodiment shown in FIGS. 1 and 2, the gauge element pattern section 12, the gauge tab pattern sections 13*a* and 13*b*, the connecting pattern sections 15*a* and 15*b*, and the alignment marks 18*a* to 18*h*, etc. (these sections are hereinafter generally called "metallic foil pattern sections") are bonded using, for example, an adequate adhesive onto the surface of the gauge base 11 (the top surface in FIG. 2) and patterned by photo etching. Further, on the surface of the gauge base 11 having these metallic foil pattern sections attached by such a means as an adhesive, the laminating film 17 is attached to cover a region ranging from a position beyond the gauge tab pattern sections 13*a* and 13*b* to the tip (left end) of the gauge base 11, for example, by such a means as an adequate adhesive. Furthermore, the protruding portion 17*a* at the tip is not coated with an adhesive, etc., when the strain gauge is delivered from the factory.

Meanwhile, as can be seen from FIG. 2, the laminating film 17 also covers the surroundings of the bases of the soldering portions 16*a* and 16*b* of the gauge leads 14*a* and 14*b* soldered to the gauge tab pattern sections 13*a* and 13*b*, for preventing moisture absorption.

The strain gauge for measuring large strains assembled as described above and delivered from the factory is bonded to an object to be measured 19 of a machine or structure, etc., as shown in FIG. 2 for measuring a large strain. This work is explained below. At first, all or some of the alignment marks 18*a* to 18*h* of the gauge base 11 are made to agree with the lines scribed (not shown in the drawings) on the object to be measured 19, and the back surface coated with an adhesive, of the gauge base 11 of the strain gauge is bonded to the object to be measured 19. In succession to the bonding work, the back surface coated with an adhesive, of the protruding portion 17*a* formed at the tip of the laminating film is strongly bonded to the object to be measured 19.

Since the metallic foil pattern sections are water-tightly covered with the laminating film 17 like this, the deterioration caused by moisture absorption and the damage incurred from outside can be prevented. In addition, the separation of the gauge base 11 from the object to be measured 19 at near the tip end 11*a* of the base gauge 11 occurring in the conventional strain gauge can be reliably prevented by the protruding portion 17*a* of the laminating film 17, and as a result, the strain gauge can respond also to large strains of 20% to 25%.

The separation preventive effect of the protruding portion 17*a* varies depending on the length E of the protruding portion 17*a*, but it was confirmed that if E is in a range from 0.3 mm to 1.5 mm, the effect can be sufficiently exhibited. For example, when the length E of the protruding portion 17*a* was set at 0.5 mm in a strain gauge with a base length D of 11 mm for the gauge base 11 and with a gauge length of 5 mm, the intended objective could be sufficiently achieved.

Figure 3:
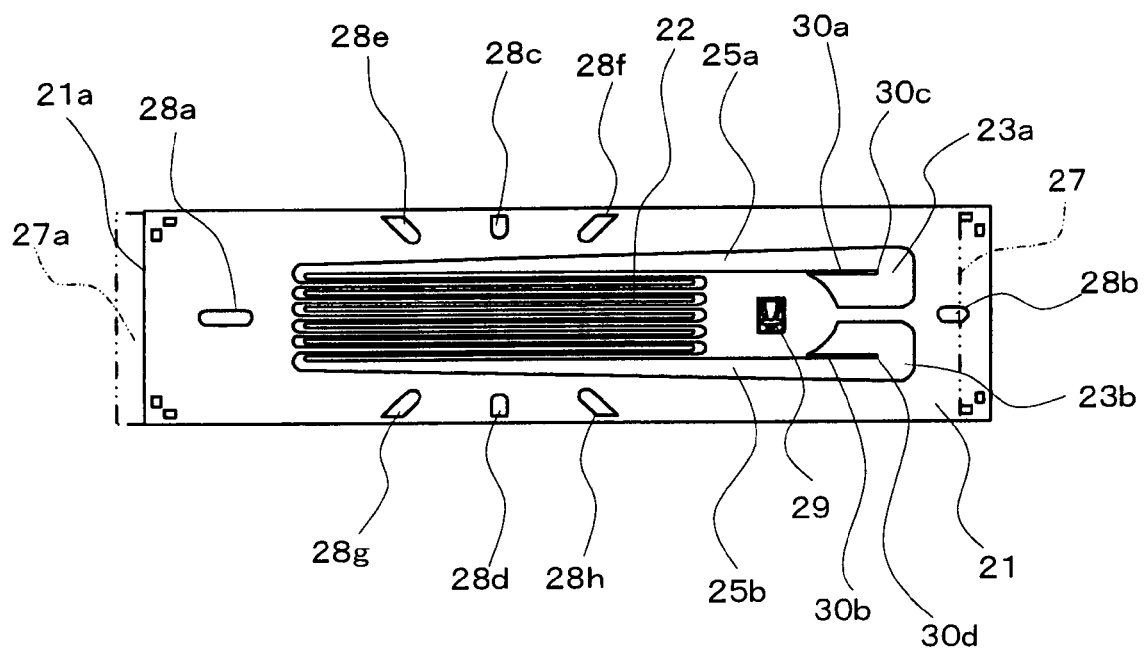
FIG. 3 is a plan view showing the constitution of a strain gauge for measuring large strains as a second embodiment of this invention.

FIG. 3 is a plan view showing a strain gauge for measuring large strains as a second embodiment of this invention.

FIG. 3 shows a strain gauge not covered with a laminating film 27, and the laminating film 27 is indicated by virtual lines (two-dot-dash lines).

The strain gauge for measuring large strains shown in FIG. 3 is an example of foil gauge type uniaxial strain gauges as described above.

In it, symbol 21 denotes a gauge base formed of a flexible insulation material such as a polyimide resin as a rectangular sheet.

Symbol 22 denotes a narrow gauge element pattern section formed by patterning a resistance material such as a foil made of Cu—Ni alloy by a photo etching technique into a continuously folded-back zigzag pattern with a predetermined gauge length. Its resistance value can be changed in response to the strain caused in the object to be measured and transmitted through said gauge base 21.

Symbols 23*a* and 23*b* denote a pair of gauge tab pattern sections formed of the same material as that of said gauge element pattern section 22 simultaneously with it and are formed to be wider compared with the width of the gauge element pattern section 22, to facilitate the connection with gauge leads (lead wires) not shown in the FIG. 3.

Symbols 25*a* and 25*b* denote connecting pattern sections connected at the respective ends on one side with said pair of gauge tab pattern sections 23*a* and 23*b* and connected at the ends on the other side with the respective ends of the gauge element pattern section 22.

Symbol 27 denotes, as in the case of the strain gauge described as the first embodiment of this invention and shown in FIGS. 1 and 2, a laminating film, for example, a polyester film that covers the surfaces of the gauge element pattern section 22, the gauge tab pattern sections 23*a* and 23*b* and the connecting pattern sections 25*a* and 25*b*, for preventing the deterioration caused by moisture absorption and the damage incurred from outside, and the laminating film 27 has a protruding portion 27*a* for preventing the separation on the tip side of the gauge base 21.

The strain gauge constituted as described above as the second embodiment has a feature that slits are formed to deconcentrate the stress for preventing the disconnection due to breakage, at the portions connected with said connecting pattern sections 25*a* and 25*b*, of the gauge tab pattern sections 23*a* and 23*b*. This is explained below more particularly. The ends of the gauge tab pattern sections 23*a* and 23*b* on the side facing the gauge element pattern section 22 are formed like a circular arc with its hollow face turned toward the gauge element pattern section 22 (leftward in FIG. 3). Further, at the junctions of the gauge tab pattern sections 23*a* and 23*b* with the connecting pattern sections 25*a* and 25*b*, slits 30*a* and 30*b* with a depth starting from the ends of the gauge tap pattern sections 23*a* and 23*b* on the gauge element pattern section 22 side to reach near the central portions of the gauge tab pattern sections 23*a* and 23*b* are formed in the sensitive axis direction.

The action of the strain gauge for measuring large strains constituted as described above as the second embodiment is explained below. For example in the case where the back surface of the gauge base 21 is coated with an adhesive and bonded to an object to be measured and where the strain gauge is elongated by pulling, the stress is concentrated near the boundary portions of the gauge tab pattern sections 13*a* and 13*b* with the connecting pattern sections 15*a* and 15*b* in the strain gauge for measuring large strains shown in FIG. 1 as the first embodiment. However, in case of the strain gauge for measuring large strains shown in FIG. 3, the stress is concentrated at the deepest portions 30*c* and 30*d* of the slits 30*a* and 30*b*.

However, since the regions near the deepest portions 30*c* and 30*d* of the slits 30*a* and 30*b* where the stress is concentrated are wide and long, that is, since the regions are near the central portions of the gauge tab pattern sections 23*a* and 23*b* respectively with a large area, the stress is deconcentrated, and there is no possibility that the disconnection due to breakage is caused by stress concentration.

On the other hand, as explained for the first embodiment, also in this second embodiment, in a state for measurement where the back surface of the gauge base 21 and the back surface of the protruding portion 27a of the laminating film 27 are bonded by an adhesive to an object to be measured, the laminating film 27 airtightly covers the metallic foil pattern sections such as the gauge element pattern section 22. So, the deterioration caused by moisture absorption and the damage incurred from outside are prevented, and the separation of the gauge base 21 from the object to be measured at near the tip portion 21a of the gauge base 21, which occurred in the conventional strain gauges, can be reliably prevented by the protruding portion 27a of the laminating film 27. As a result, the strain gauge can respond also to large strains of 20% to 25%.

The separation preventive effect of the protruding portion 27a is almost equivalent to that of said first embodiment.

However, the second embodiment is different from said first embodiment as follows. A first feature of the second embodiment is such that slits 30a and 30b for deconcentrating the stress for preventing the disconnection due to breakage are formed at the junctions of the gauge tab pattern sections 23a and 23b with the connecting pattern sections 25a and 25b. The slits 30a and 30b are formed in the sensitive axis direction of the gauge element pattern section 22 with a depth starting from the ends of the gauge tab pattern sections 23a and 23b on the gauge element pattern section 22 side to reach the deepest portions 30c and 30b near the central portions of the gauge tab pattern sections 23a and 23b.

The working effect of the slits 30a and 30b is already described before.

A second feature is such that the length of the connecting pattern sections 25a and 25b is longer compared with that of the general strain gauge, and that the gauge tab pattern sections 23a and 23b are formed far away from the gauge element pattern section 22.

In the constitution as described above, the boundary portions of the gauge tab pattern sections 23a and 23b with the connecting pattern sections 25a and 25b where the stress is likely to be concentrated can be kept far away from the gauge element pattern section 22, so that the gauge element pattern section 22 can be less likely to be affected by stress concentration. Therefore, large strains can be highly accurately measured.

A third feature is such that the dimension of the gauge base 21 in the width direction (in the vertical direction in FIG. 1) is set at a smaller value compared with that of the general strain gauge.

If said dimension is set as described above, the deformation in the width direction by the Poisson ratio can be kept small, and this is effective for preventing the separation of the gauge base 21 from the object to be measured.

A fourth feature is such that among the alignment marks 28a to 28h as reference marks for attaching the strain gauge to an object to be measured, the alignment mark 28a formed near the tip portion (the left end portion in FIG. 3) 21a of the gauge base 21 is formed more inward (rightward in FIG. 3) from the tip portion 21a of the gauge base 21.

In the constitution as described above, the elongation property of the gauge base 21 near the tip portion can be kept highly uniform to inhibit the separation at the tip portion of the gauge base 21, and the large strain measuring range can be further expanded.

Meanwhile, this invention is not limited to the above-mentioned embodiments only, and can be variously modified within the scope not deviating from the gist of this invention.

For example, at each of the folded-back portions of the zigzag gauge element pattern section, a slit can be formed in the sensitive axis direction to deconcentrate the stress for preventing the disconnection due to breakage. In this constitution, the disconnection due to breakage at the junctions between the folded-back portions and gauge strand portions can be prevented. In other words, a strain gauge with the strain limit value enhanced greatly can be provided.

Figure 4:
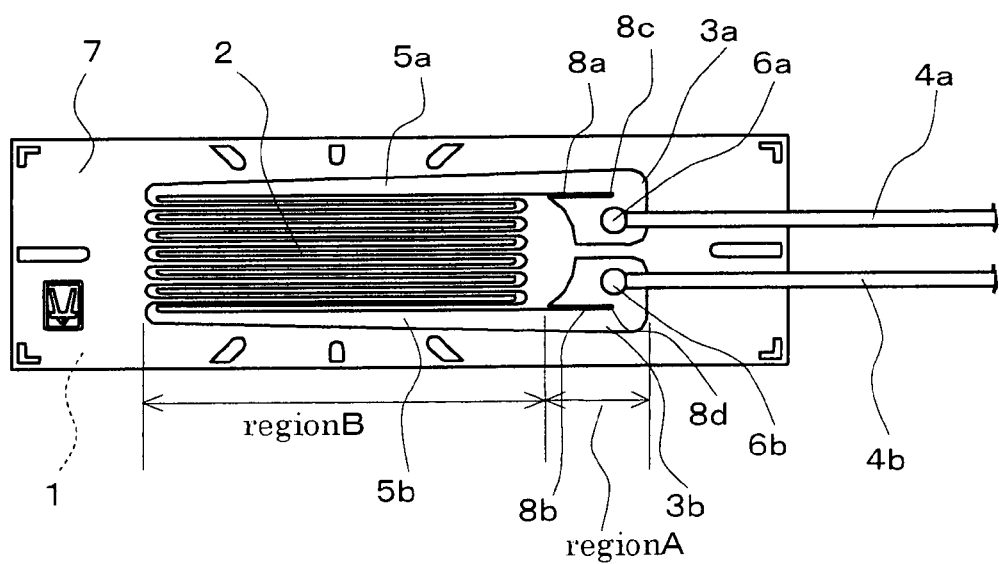
FIG. 4 is a plan view showing the constitution of a conventional strain gauge.
Figure 5:
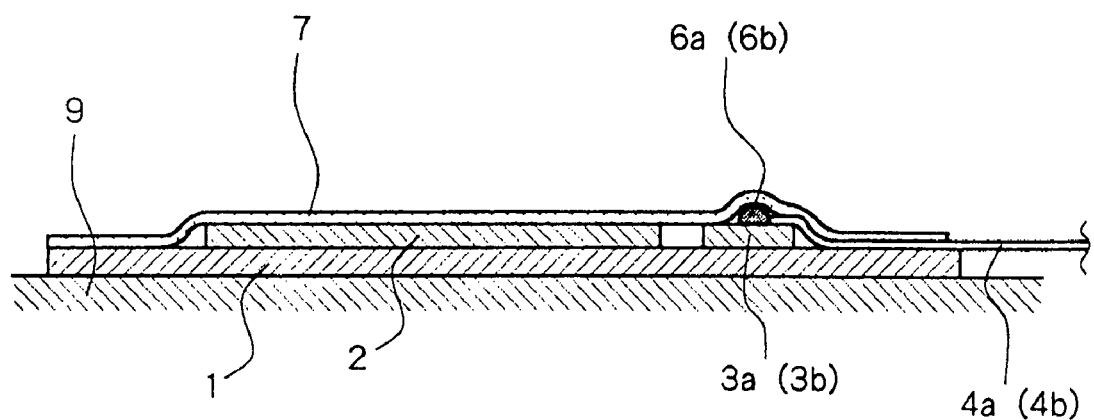
FIG. 5 is a sectional view typically showing the sectional constitution of the conventional strain gauge shown in FIG. 4.

Further, in the conventional strain gauge of FIG. 4, the logo mark of the manufacturer is attached on the tip side of the gauge base 1. However, if the logo mark provided as a metallic foil exists in this portion, the stress cannot be uniformly distributed, to adversely affect separation. So, it is desirable to move it to an intermediate portion among the gauge element pattern section 22 and the gauge tab pattern sections 23a and 23b as shown in FIG. 3.

What is claimed is:

1. A strain gauge for measuring large strains, comprising metallic foil pattern sections including a narrow gauge element pattern section formed of a resistance material and capable of changing its resistance in response to a detected strain, at least a pair of wide gauge tab pattern sections connected with gauge leads, and at least a pair of connecting pattern sections capable of electrically connecting the respective ends of said gauge tab pattern sections and said gauge element pattern section, said metallic foil pattern sections being attached onto a gauge base formed of a flexible insulation material, said gauge base having said metallic foil pattern sections attached being covered on the surface side with a laminating film, said laminating film being extended by a predetermined length from an end of the gauge base on said gauge element pattern section side, to form a protruding portion, and when the strain gauge is attached to an object to be measured, the back side of said gauge base and the back side of said protruding portion being attachable to said object to be measured.

2. A strain gauge for measuring large strains according to claim 1, wherein said laminating film is formed of at least one resin selected from polyesters, polyamideimides and polyimides.

3. A strain gauge for measuring large strains according to claim 1 or 2, wherein the length of said protruding portion is set at 0.3 mm to 1.5 mm from said end of the gauge base.

4. A strain gauge for measuring large strains according to claim 1, wherein length of said connecting pattern sections is longer than that of the strain gauge as a whole, and said gauge tab pattern sections are kept far away from said gauge element pattern section.

5. A strain gauge for measuring large strains according to any claim 1 or 2 wherein a dimension in a width direction of said gauge base is smaller than a dimension in a width dimension of strain gauge as a whole.

6. A method for measuring large strains comprising forming an alignment mark as a reference mark for attaching the strain gauge of claim 1 to an object to be measured and attaching the strain gauge of claim 1 to the object so that the alignment mark is at a position apart from said end portion of said gauge base.

7. A strain gauge for measuring large strains according to claim 1, wherein slits for deconcentrating the stress to thereby prevent disconnection due to breakage are formed in portions connected with said connecting pattern sections, of said gauge tab pattern sections.

8. A strain gauge for measuring large strains according to claim 7, wherein said slits are formed along a sensitive axis of the gauge element pattern section, with a depth starting from the ends of the gauge tab pattern sections on gauge element pattern section side to reach near central portions of the gauge tab pattern sections.

* * * * *